United States Patent [19]
Rouverol

[11] 3,918,315
[45] Nov. 11, 1975

[54] HIGH CAPACITY GEARING

[76] Inventor: William S. Rouverol, 22 Lovell Ave., Mill Valley, Calif. 94941

[22] Filed: July 22, 1974

[21] Appl. No.: 490,761

[52] U.S. Cl. ................................. 74/462; 74/462
[51] Int. Cl.² ...................................... F16H 55/06
[58] Field of Search ...................................... 74/462

[56] References Cited
UNITED STATES PATENTS
3,824,873   7/1974   Rouverol .............................. 74/462

Primary Examiner—Leonard H. Gerin
Attorney, Agent, or Firm—Gordon Wood

[57] ABSTRACT

A type of gearing that significantly increases the torque capacity of high reduction gearing. This is accomplished by utilizing on the larger of a pair of mating gears a larger pressure angle than that of the smaller gear, and also in some cases a circular arc profile that has a shorter radius than that of an involute profile. The effect of these profile characteristics is to shift the principal tooth load away from the region where the line of action is tangent to the base circle of the smaller gear. Since this is the region where the relative radius of profile curvature is at a minimum, it is the place where tooth surface stresses tend to be a maximum. Relief of the surface stresses in this region therefore allows the gear set to carry greater torque without being subject to failure by surface pitting.

20 Claims, 3 Drawing Figures

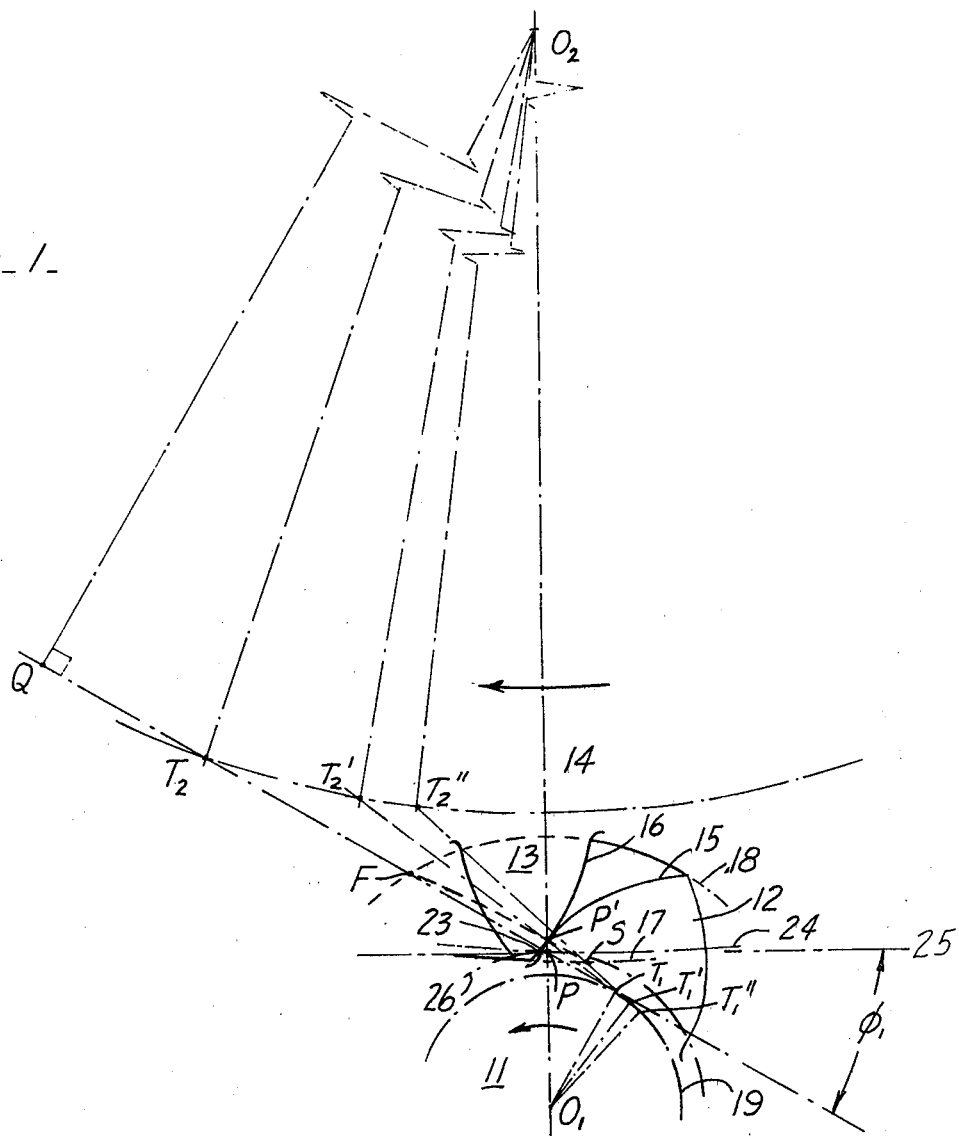
_Fig. 1_
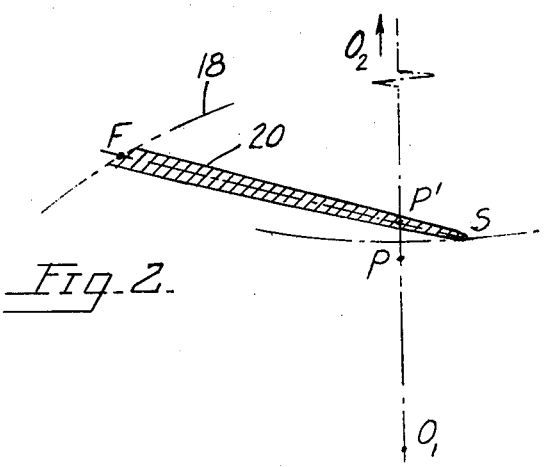
_Fig. 2_
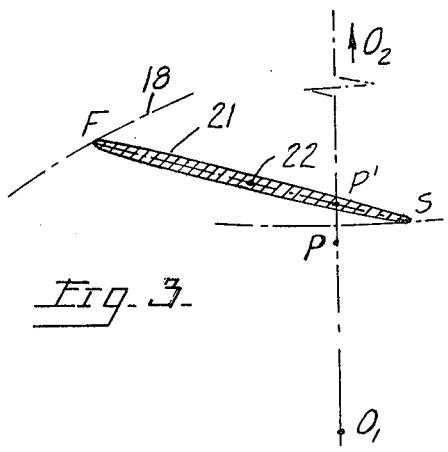
_Fig. 3_

HIGH CAPACITY GEARING

This invention relates to the profile and shape of gear teeth. Specifically, it relates to a type of tooth profile that increases the torque capacity of gear sets in which the driving and driven gears have unequal pitch diameters. It is applicable to all types of parallel-axis and intersecting-axis gearing and is particularly advantageous in gear sets where the reduction ratio is unusually high and the number of teeth on the pinion is small.

It is well known to gear designers that the surface or "contact" stress in gear teeth, whether calculated from basic theory of elasticity or standard gear design formulas, depends on the relative radius of curvature of the contacting surfaces. The basic equation for a relative radius of curvature $r$ is as follows:

$$r = \frac{1}{\frac{1}{r_1} + \frac{1}{r_2}} \quad (1)$$

where $r_1$ and $r_2$ are the radii of curvature of the mating profiles at the point under consideration.

When this relation is utilized in the basic equations for contact stress, the peak contact stress $q_o$ normal to the contacting surfaces at the center of the contact area is calculated from an expression of the form $$q_o = C \sqrt{\frac{1}{r_1} + \frac{1}{r_2}} \quad (2)$$

where $C$ is a constant that incorporates the applied torque and the various parameters of tooth geometry and materials, including helix angle, pressure angle, pitch diameter, moduli of elasticity, Poisson's ratio and transverse contact ratio.

It is conventional practice among gear designers to use for $r_1$ and $r_2$ in equation 2 the tooth profile radii at the pitch point. However this can be over-optimistic and can, especially in the case of high reduction gearing, lead to premature pitting failure. The reason is that for an involute spiral, the radius of curvature at any point is the distance from that point to the point of tangency of the base circle. If an involute tooth profile is in contact at or near this point of tangency, the radius of curvature ($r_1$ or $r_2$ in equation 2) will approach zero, and the contact stress $q_o$ at that point must approach infinity.

The primary object of the invention is therefore to provide improved gear tooth profiles for gear pairs in which one of the pair has an addendum circle that intersects the line of action close to the point where it is tangent to the base circle of the other gear. These improved gear tooth profiles are intended to increase the allowable torque carried by such gear pairs by reducing the contact stress induced in the teeth in the region of this point of tangency.

A secondary object of the invention is to provide a type of gear tooth profile that engages more gradually and with less impact than conventional involute teeth, and which therefore promotes quieter, smoother operation.

The means to achieve these and other objects and advantages of the invention will be evident from the drawings and specification that follows.

FIG. 1 is a partial section of a pair of mating gears taken perpendicularly to the pitch line and showing mating tooth profiles embodying the invention.

FIG. 2 is a schematic view of the same showing the contact area on the helical tooth of the smaller gear of FIG. 1 projected onto a plane perpendicular to the pitch line.

FIG. 3 is the same view as FIG. 2 but for a gear set modified to produce a different shaped contact area than that of FIG. 2.

In detail and referring to FIG. 1, a smaller gear 11 is mounted for rotation about its central axis $O_1$ and has helical teeth 12 that engage mating helical teeth 13 on a larger gear 14, which has its center at $O_2$. The smaller gear 11 and larger gear 14 also have additional teeth, and rims and hubs of conventional design, but these have been omitted in the interest of clarity.

The particular section shown in FIG. 1 is the one showing the tooth profiles 15, 16 in contact at a point P' on the line of centers $O_1$ $O_2$. It is to be noted that P' is at a different point than the pitch, which is at P. The point P' is one point on the line of action SF. When the gears are transmitting full torque, contact between the mating profiles 15, 16 starts at the point S where the line of action SF intersects the addendum circle 17 of larger gear 14 and ends at the point F where the line of action intersects the addendum circle 18 of the smaller gear 11.

In the embodiment of FIG. 1, the typical tooth profile 15 of the smaller gear 11 is an involute spiral with base circle 19. Its mating profile 16 on gear 14 is a circular arc whose center moves from $T_2''$ to $T_2'$ to $T_2$ as gear 14 is turned clockwise by gear 11. The corresponding centers of curvature of the involute profile 15 of the smaller gear 11 are $T_1''$, $T_1'$ and $T_1$, which are successive points of tangency of the pressure line ($T_1''$ $T_2''$, $T_1'$ $T_2'$, and $T_1$ $T_2$) as it rotates counterclockwise.

During this rotation the contact point moves up the line of action SF from S to P' to F. At the final point of contact F, the pressure line is the straight line $QT_2FPT_1$, which passes through the pitch point P. When the mating profiles 15, 16 are in contact at point F, they therefore momentarily satisfy the "Law of Gearing," which states that for gears to transmit uniform angular velocity, the common normal to the contact surfaces must pass through the pitch point.

In gearing embodying the present invention, the point F is called the "culmination point." This is because the load on a particular profile increases as it moves up the line of action, reaching a maximum at this point. Viewed in another way, when the gears 11, 14 are rotating but not transmitting any torque, the tooth profiles 15, 16 will be in contact at point F, but will be separated by a small amount at all other points. The amount of separation varies as the square of the distance of the profiles from the point F, reaching a maximum at S.

The amount of separation between unloaded profiles at any point is substantially the same as the difference between the local deformation at that point and the deformation at the culmination point for fully loaded gears. To calculate it another statement of the "Law of Gearing" may be utilized: "The common normal to the contact surfaces divides the line of centers in inverse proportion to the velocity ratio."

Since the pitch point may be defined as a point whose distance from the axes of a pair of mating gears is in exact proportion to the number of teeth on each of those gears, it will be evident that if the mating profiles 15, 16 are in contact at P' rather than P, then the ratio $P'O_2/P'O_1$ must be smaller than the ratio $PO_2/PO_1$, that is to say, smaller than the velocity ratio. Hence in this position profile 15 must be overtaking profile 16. This means that if the gears are unlodaded, the separation between unloaded, profiles is being diminished at this point, or if the gears are transmitting torque, the tooth surface deformation is increasing. Consequently, the separation will diminish (or deformation increase, as the case may be) until the profiles are in contact at the culmination point F, at which time the pressure line has rotated down to the position FP and no further convergence of the profiles occurs because the common normal to the contact surfaces at the point F divides the line of centers $O_1O_2$ in exact proportion to the velocity ratio.

It will be evident from a consideration of this loading cycle that for the gears 11, 14 to transmit a constant velocity ratio, the face width of the gears and the helix angle must be large enough so that for all rotational positions of the gears 11, 14 there is at least one culmination point. That is to say, the tooth overlap ratio must be at least unity. In practice, overlap ratios of two or more highly desirable, to insure smooth operation.

The effect of this decrease in separation (or increase in tooth deformation in the case of loaded gears) as the profiles 15, 16 move from point S to the culmination point F is to change the uniform width contact area that occurs on involute teeth to an elliptical contact area. If the smaller gear 11 is always the driving gear and the velocity ratio is large, the optimum contact area shape will be a semi-ellipse, which when projected onto planes perpendicular to the pitch line is indicated as the shaded area 20 in FIG. 2. (Other features of FIG. 2 are identical to those of FIG. 1 bearing the same number or letter). It is this shape of contact area 20 that places the major load at that point F on the line of action SF (which need not be a straight line) where the relative radius of curvature is the greatest and where this load will consequently produce a lower contact stress than at any other point on the line of action SF. This will obviously lead to a maximization of torque capacity.

Examination of the geometry of FIG. 1 discloses how a semi-elliptical contact area such as shown projected in FIG. 2 may be obtained. The principal prerequisite is a pressure line ($T_2'' T_1''$, $T_2' T_1'$) that intersects the line of centers $O_1O_2$ not at the pitch point P, but at points such as P' between the pitch point P and the center $O_2$ of the larger gear 14. One way to achieve this is to place the center of curvature of the tooth profile 16 of the larger gear 14 not at Q, where it would be for an involute profile, but at a point such as $T_2$ that is closer to the pitch point P. This reduction in the radius of curvature $r_2$ of the tooth profile 16 of the larger gear 14 causes the center of curvature to trace a path $T_2'' T_2' T_2$ which is oblique to the line QP. In the embodiment of FIG. 1 the tooth profile 16 of the larger gear 14 is a circular arc in the transverse plane, so that its radius of curvature $r_2$ is constant and equal to the lengths $T_2''$ S, $T_2'$ P' and $T_2$F.

It is evident from FIG. 1 that if the arc $T_2'' T_2' T_2$ described by the center of curvature of the tooth profile 16 of the larger gear 14 were to be continued beyond $T_2$, it would give rise to arc centers below the line QP. Pressure lines with centers below this line would intersect the line of centers $O_1 O_2$ not above the pitch point P but below it. Consideration of the Law of Gearing in this case would then indicate that the separation of the profiles 15, 16 would be increasing (or the tooth deformation decreasing) in this region beyond the culmination point F. It is therefore obviously possible to produce a contact area which is a full ellipse rather than a semi-ellipse. Such a contact area is shown projected as the shaded area 21 in FIG. 3. In this case the optimum proportions would place the center 22 of the ellipse about halfway between S and F rather than at F. In this modification the point 22 is the culmination point and should lie on the line containing Q $T_1$ and the pitch point P.

The modified contact area 21 of FIG. 3 has its primary utility in speed increasing drives or gear sets where the velocity ratio is not far from unity. This is because in a speed increasing drive the leading end of the contact area would be the point F, and some attenuation of its width in the area of F will significantly reduce operating noise. The other reason for utilizing a contact area of the type indicated in FIG. 3, in the case of gear sets having a velocity ratio close to unity, is to keep the radius of curvature of the tooth profile 16 on the larger gear 14 from being shorter than the radius of curvature of the tooth profile 15 of the smaller gear 11 at the culmination point F.

Returning to a consideration of the geometry of FIG. 1, it can be seen that Q is the point where the line of action would be tangent to the base circle of the larger gear 14 if the profiles of its teeth were involute curves. The further the point $T_2$ is from Q, the greater will be the angle between the arc $T_2'' T_2' T_2$ and the line QP, and the greater will be the distance PP' for a given angle of turn of the gears 11, 14. For any given location of the point $T_2$ the separation velocity can be obtained, by either graphical or analytical integration of the separation of the profiles 15, 16 at various points along the line of action SF. From this separation data the relative radius of curvature of the tooth profiles in the lengthwise direction may be obtained. Using this in conjunction with the relative radius of curvature in the normal direction allows the major and minor semi-axes of the contact ellipses to be calculated by conventional theory of elasticity. Determination of these two semi-axes allows the tooth load capacity to be calculated, as well as the tooth size, so that the contact ellipse matches the full tooth working depth when the gears are carrying the full allowable torque load.

When the teeth have been sized, it is not sufficient to specify merely the radius of curvature $r_2$ of the tooth profiles 16 of the larger gear 14. From FIG. 1 it may be seen that because the profiles 15, 16 are in contact at P' rather than at the pitch point P, the pressure angle $\phi_2$ of the larger gear will not be the same as the pressure angle $\phi_1$ of the smaller gear 11. The pressure angle $\phi_2$ may be found by drawing the tangent to the tooth profile 16 of the larger gear 14 at the point 23 where it (or its extension) crosses the pitch circle 24 of the larger gear 14. The angle this tangent makes with a radial line from $O_2$ to point 23 will be the correct pressure angle $\phi_2$ for the larger gear 14. It will always be larger than that for the smaller gear 11, which as in the case of conventional involute gears is the angle $\phi_1$ the line $PT_1$ makes with the common plane 25 tangent to the pitch circle 24 of the larger gear 14 and the pitch circle 26 of the smaller gear 11.

In gear teeth embodying the preferred form of the invention as shown in FIGS. 1 and 2, it will be evident that the major portion of the tooth surface load is carried by the tip of the teeth 12 of the smaller gear 11 and the flank of the teeth 13 of the larger gear 14. Consequently the bending stresses induced in the roots of the teeth 12 of the smaller gear 11 may be excessive unless these teeth 12 are formed to be wider at the base than the teeth 13 of the larger gear 14. This allows the addenda of the teeth 12 of the smaller gear 11 to be even larger than they are in conventional unequal addenda involute teeth. Another recourse that may be used to increase the bending strength of the teeth 12 of the smaller gear 11, is to use a pressure angle $\phi_1$ that is greater than the conventional 20°.

It may be noted that a number of modifications to the preferred form of the inventions as shown in FIGS. 1 and 2 will be obvious to those skilled in the art. The novel features of the invention may be applied to spiral bevel gears or herringbone gears, and even to spur gears, especially if they are of the stepped form or the load is relatively constant and the transverse contact ratio is approximately an integer. Also various curves similar to those specified may be substituted, such as circular arcs for the involute curves of the smaller gear 11, involute curves generated from an eccentric base circle for the circular arcs or involute curves of either gear, or segments of ellipses for circular arcs such as result if the teeth are formed to have circular arcs in the normal plane instead of the transverse plane.

Another possible modification to the preferred embodiment of the invention is to use involute curves on the teeth of the smaller and larger gears, but to use a slightly larger pressure angle on the larger gear than is used on the smaller gear. This produces a gear set that has a line of action that coincides with the pressure line at all positions of rotation, and intersects the line of centers at a fixed point between the pitch point and the center of the larger gear. In this configuration the mating teeth have no culmination point, but instead converge on each other at a fixed rate as the contact point moves up the line of action. To promote smoother operation, especially at low load, the tips of the teeth of the smaller gear or the flanks of the teeth of the larger gear may be relieved slightly. Correct design of this type of gearing requires that the difference in the pressure angles of the smaller and larger gears be exactly calculated to produce a convergence of the mating profiles that exactly equals the tooth deformation under load, for otherwise the velocity ratio imposed by the ratio of the respective number of teeth on the mating gears will differ from the velocity ratio imposed by the deviation from the law of gearing represented by the failure of the common normal to the tooth surfaces to intersect the line of centers at the pitch point.

The specific description given above of the preferred form of the invention should not be taken as restrictive, as it will be evident that various other modifications in design may be resorted to by those skilled in the art without departing from the scope of the following claims.

I claim:

1. In a pair of mating gears comprising a larger gear and a smaller gear,
    teeth formed on said gears to be in contact at a point between the pitch line and the axis of said larger gear,
    the centers of curvature of the profile curves of said teeth at said point being substantially removed from said pitch line.

2. A pair of mating gears according to claim 1 wherein the relative radius of curvature of said profiles at said point in planes perpendicular to the pitch line is smaller than the sine of the pressure angle of said smaller gear divided by the sum of the reciprocals of the pitch radii of said gears.

3. A pair of mating gears according to claim 1 wherein the pressure angle of said larger gear is larger than that of said smaller gear.

4. A pair of mating gears according to claim 1 wherein the working profiles of the teeth of one of said gears in planes normal to the pitch line are circular arcs.

5. A pair of mating gears according to claim 1 wherein said teeth are slantingly disposed with respect to said pitch line.

6. A pair of mating gears according to claim 5 wherein the working profiles of the teeth of one of said gears in planes normal to the tooth direction are circular arcs.

7. A pair of mating gears according to claim 1 wherein said smaller gear has fewer than twelve teeth.

8. A pair of mating gears according to claim 1 wherein said smaller gear has working tooth profiles that are involute curves.

9. A pair of mating gears according to claim 1 wherein the culmination point of a pair of mating teeth is on the same side of the line of centers of said pair as the center of curvature of the working profiles of said larger gear when said pair of mating teeth are in contact on said line of centers.

10. A pair of mating gears according to claim 1 wherein the pressure angle of said smaller gear in planes normal to the tooth direction is greater than 20°.

11. A pair of mating gears according to claim 4 wherein the radius of said circular arc is less than the pitch radius of said larger gear times the sine of the pressure angle of said smaller gear.

12. A pair of mating gears according to claim 1 wherein the working profiles of the teeth of both gears are circular arcs.

13. A pair of mating gears according to claim 9 wherein said culmination point is adjacent to the addendum surface of said smaller gear.

14. A pair of mating gears according to claim 1 wherein the addendum coefficient of said smaller gear is greater than that of said larger gear.

15. A pair of mating gears according to claim 1 wherein the root thickness of the teeth on said smaller gear is greater than the root thickness of the teeth on said larger gear.

16. A pair of mating gears according to claim 1 wherein the ratio of the number of teeth on said larger gear to that on said smaller gear is greater than 4.

17. A pair of mating gears according to claim 1 wherein said teeth are formed to produce a contact area between mating teeth having a substantially elliptical boundary.

18. A pair of mating gears according to claim 17 wherein the center of said elliptical contact area is adjacent to the addendum circle of said smaller gear.

19. A pair of mating gears according to claim 17 wherein said contact area occupies substantially the full working depth of said teeth.

20. A pair of mating gears according to claim 1 wherein the transverse contact ratio is approximately equal to an integer.

* * * * *